United States Patent [19]

Hasler

[11] 4,194,225

[45] Mar. 18, 1980

[54] HOUSING FOR DISK DRIVE UNIT

[75] Inventor: Alfred Hasler, Mountain View, Calif.

[73] Assignee: International Memories, Inc., Cupertino, Calif.

[21] Appl. No.: 913,156

[22] Filed: Jun. 6, 1978

[51] Int. Cl.² .......................................... G11B 17/02
[52] U.S. Cl. .................................................... 360/98
[58] Field of Search .................................. 360/97–99

[56] References Cited

U.S. PATENT DOCUMENTS 3,723,980  3/1973  Gabor .................................... 360/98

*Primary Examiner*—Robert S. Tupper
*Attorney, Agent, or Firm*—John L. McGannon

[57] ABSTRACT

A disk drive unit having a housing provided with an upper region, a lower region, and a central region between the upper and lower regions. The upper region contains one or more rotatable memory disks, and the central region communicates with the upper region and contains a drive motor, the upper and central regions being closed to the atmosphere. The disks are coupled to a rotatable hub in the upper region and the hub has an improved jam screw for securing it to one end of the drive shaft of the drive motor so that the disks can be rotated at high speeds. One or more read-write heads can be used with each disk, respectively, and a linear motor coupled with each head moves the latter radially of the corresponding disk in accordance with control signals applied to the linear motor. The hub has vanes for drawing air by suction from the central region into the upper region, and a filter is in the path of flow of air from the upper region to the central region to remove foreign particles from air flow and thereby clean the air as the hub rotates. An impeller in the lower region is coupled to the opposite end of the shaft of the drive motor for directing cooling air toward and into contact with one or more circuit boards carried by the base adjacent to the lower region.

16 Claims, 5 Drawing Figures

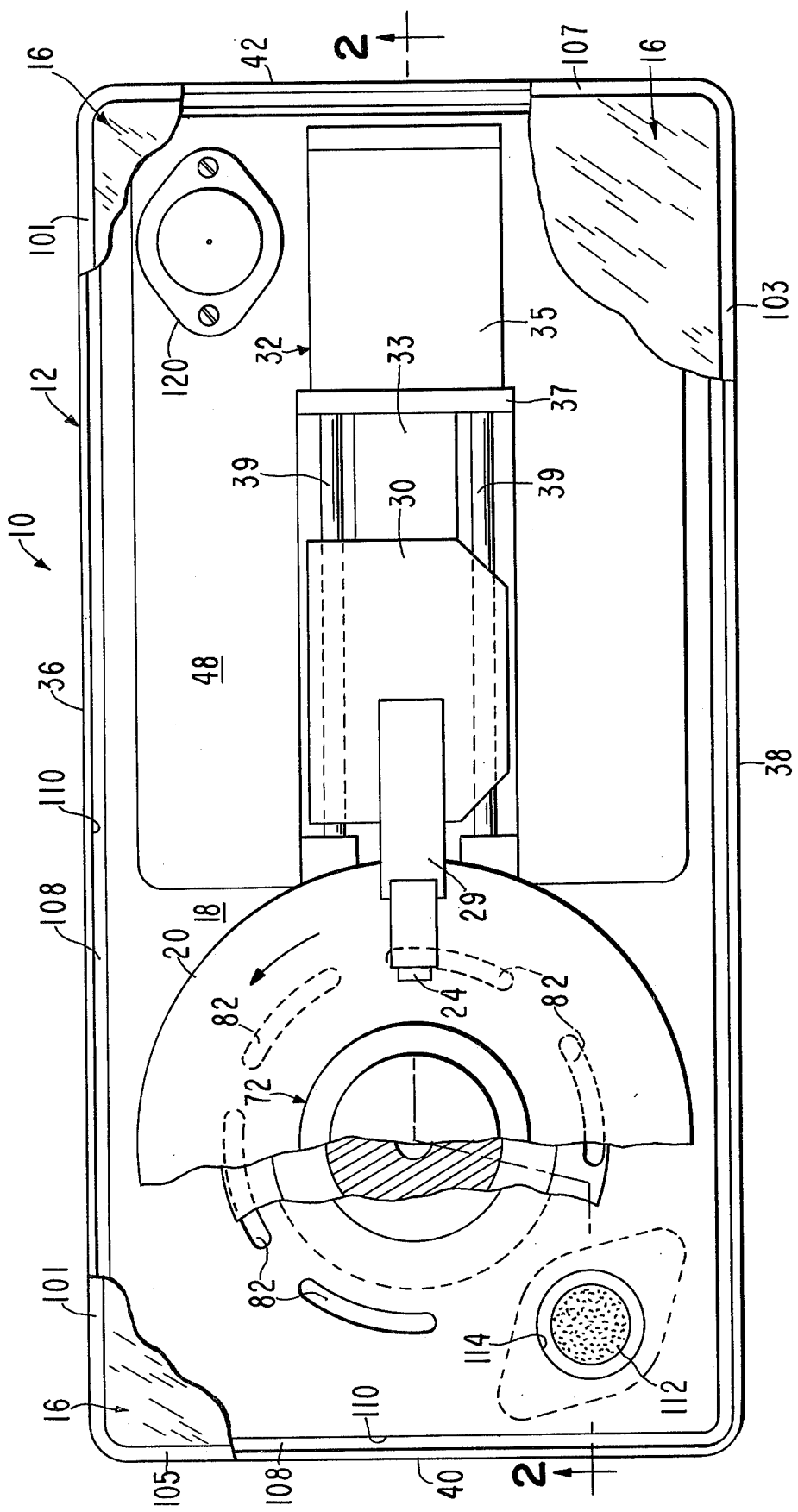

HOUSING FOR DISK DRIVE UNIT

This invention relates to improvements in magnetic disk drives and, more particularly, to a disk drive unit having an improved housing rendering the unit substantially compact without sacrificing its magnetic storage capability.

BACKGROUND OF THE INVENTION

A number of different magnetic storage units have been in the market place to meet the increasing demands for peripheral storage equipment. At the present time, such units fall generally into two different classes, namely, units of low cost and relatively low storage capacity and units of higher cost and relatively large storage capacity. For instance, a low cost unit includes a single floppy disk and provides about one megabyte of storage capacity, the cost being about $600.—OEM. Such a unit is relatively small size, such as about 8 to 9 inches in width. Contrasted to this is the higher cost unit which is of rack size having a width of about 19 inches while providing a storage capacity of from 5 to 10 megabytes. A unit of this type typically sells for about $2,500.00 to $5,000.—OEM. At present, there are no small size magnetic storage units having a price which falls between the two extremes mentioned above and which provides a relatively large storage capacity, such as the rack sized unit mentioned above.

To compete with the above units in the market place while providing a relatively large magnetic storage capacity, a magnetic storage unit must not only be relatively low in price and small in size, but it must also be highly reliable and have high performance operating characteristics. The smaller the size of such unit the lower will be its production costs and thereby its sales price because of the fewer component parts needed to produce it. Because of the increased demand for high storage capacity, a need has arisen for a magnetic storage unit which meets these criteria as to provide a highly more versatile instrument for a wide variety of applications in the computer and other electronic disciplines.

SUMMARY OF THE INVENTION

The present invention satisfies the aforesaid need by providing an improved magnetic storage unit which is constructed to assure proper rotation of one or more magnetic disks yet at the same time to contribute in an improved manner to keeping the atmosphere in and around the disks substantially clean and to provide the motive source for cooling air directed onto the circuit boards of the unit itself. To this end, the invention comprises a relatively small housing having a base provided with a removable, transparent top for enclosing an upper region above the base for containing one or more memory storage disks. A single drive motor having a drive shaft projecting from opposite ends of the motor housing is placed within a central region below the upper region and communicating with the latter, the upper and central regions being closed to the atmosphere when the top covers the upper regions.

A hub on which the disks are mounted is connected by an improved jaw screw assembly to an upper end of the motor drive shaft and has a number of spaced vanes on its lower margin for creating an upwardly directed suction force in several openings through one part of the base at the junction between the upper and central regions so that an air flow will be established therebetween. The air is returned from the upper region to the central region through a filter which continously cleans the air as the hub rotates so that the environment in and around the disks is substantially clean at all times during operation of the unit.

A lower region below the central region is in communication with the atmosphere and contains an impeller which is secured to the opposite end of the motor drive shaft to create a flow of cooling air through the lower region and to direct the flow into heat exchange relationship to one or more circuit boards carried by the base. Thus, once the drive motor is operating, it rotates the hub, the disks and the impeller simultaneously. Thus, the motor serves a three-fold purpose and, in doing so, permits the housing to be of relatively small size and lightweight in construction while the housing can accommodate one or more magnetic disks representing a relatively large storage capacity yet the magnetic storage unit itself can be highly reliable, small in size, inexpensive and have high performance operating characteristics.

The primary object of the present invention is to provide a magnetic storage unit which has an improved housing of relatively small size but with sufficient space with a controlled atmosphere for containing one or more magnetic disks on a rotatable hub to provide a relatively large magnetic storage capacity for the unit yet the unit is highly reliable, can be made inexpensively and has high performance operating characteristics notwithstanding its small size so as to render it suitable for a wide variety of signal storage applications in the computer and other electronic disciplines.

Another object of the present invention is to provide a magnetic storage unit of the type described wherein the housing for the unit is of relatively small size and has an improved design which provides for the cleaning of the air in and around the one or more magnetic disks within the housing to assure error-free operation of the read-write heads on the disks, all of which can be accomplished while keeping production costs of the unit relatively low without sacrificing its relatively large magnetic storage capacity.

Another object of the present invention is to provide a magnetic storage unit of the aforesaid character wherein the housing has a single drive motor for the three-fold purpose of rotating the hub which carries the disks, creating an airflow through the region containing the disks, and generating a flow of cooling air past circuitry carried by the unit to minimize the nunber of component parts of the unit and to keep the unit lightweight in construction and inexpensive to produce and maintain.

Still another object of this invention is to provide an improved jam screw assembly for securing the hub to the drive shaft of the drive motor to assure a tight connection at all times without damaging the shaft.

Other objects of this invention will become apparent as the following specification progresses, reference being had to the accompanying drawings for illustration of the invention.

In the drawings:

FIG. 1 is a top plan view of a disk drive unit using the features of the present invention, parts being broken away and in section to illustrate details of construction;

Figure 3:
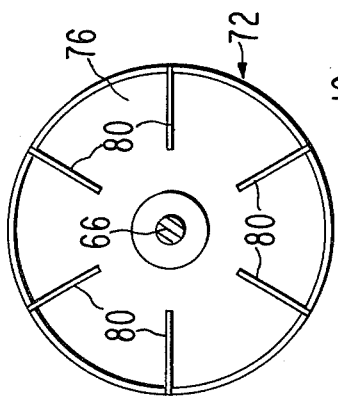
FIG. 3 is a cross-sectional view taken along line 3—3 of FIG. 2.

The disk drive unit using the features of the present invention is broadly denoted by the numeral 10 and included a housing 12 comprised of a base 14 and a top 16 removably placed on base 14 in covering relationship to an upper region space or region 18 in which a pair of vertically spaced, rotatable disks 20 and 22 are spaced. Read-write heads 24 and 26 are provided for the upper and lower surfaces, respectively of each of the disks, the read-write heads of disk 22 being omitted to simplify the drawing.

The read-write heads are carried by drive means 28 disposed within space 18, drive means 28 including a linear movable carriage 30 activated by an actuator coil 32 carried in any addressed position on base 14 and also disposed within space 18. Actuator 32 is formed from a voice coil 33 shiftable into and out of a magnetic pole piece assembly 35 carried by a bracket 37 secured to base 14. The actuator provides linear movement to carriage 30 and thereby the read-write heads. The carriage is directly secured to voice coil 33 and is mounted for linear movement on a pair of spaced, generally horizontal rods 39 (FIG. 1) by a plurality of bearings (not shown).

When magnetic pole assembly 35 is energized by external control signals, the read-write heads can be positioned selectively into any one of a number of track locations relative to the disks. The path of travel of the heads is denoted by the arrow 34 (FIG. 2).

Base 14 has a pair of opposed sidewalls 36 and 38 which are generally parallel with each other, and a pair of opposed end walls 40 and 42 which are also parallel with each other. Walls 36, 38, 40 and 42 are integral with each other and also integral with a central support wall 44 (FIG. 2) having a first wall section 46 near end wall 40 and a second wall section 48 near end wall 42, wall sections 46 and 48 being integral with each other and interconnected by an imperforate vertical wall section 50 as shown in FIG. 2, wall section 50 extending downwardly to a location 52 spaced below wall section 48.

Wall section 46 has a central aperture 54 (FIG. 2) which receives an annular projection 56 on the top margin of a DC burshless motor 58 in a central space or region 60 immediately below wall section 46. Motor 58 is supported either to wall section 46 or to a closure panel 62 secured in any suitable manner to base 14 in closing relationship to region 60. To this end, panel 62 is typically of square of rectangular configuration and is held by screws or other fastening means to sidewalls 36 and 38, end wall 40 and the lower extremity 52 of vertical central wall (FIG. 3). These walls are stepped as shown in FIG. 2 to accommodate the outer peripheral margin of panel 62, there being a continuous seal 64 at the junction between panel 62 and the adjacent side, end and mid-walls to assure that region 60 is closed to the atmosphere.

Figure 2:
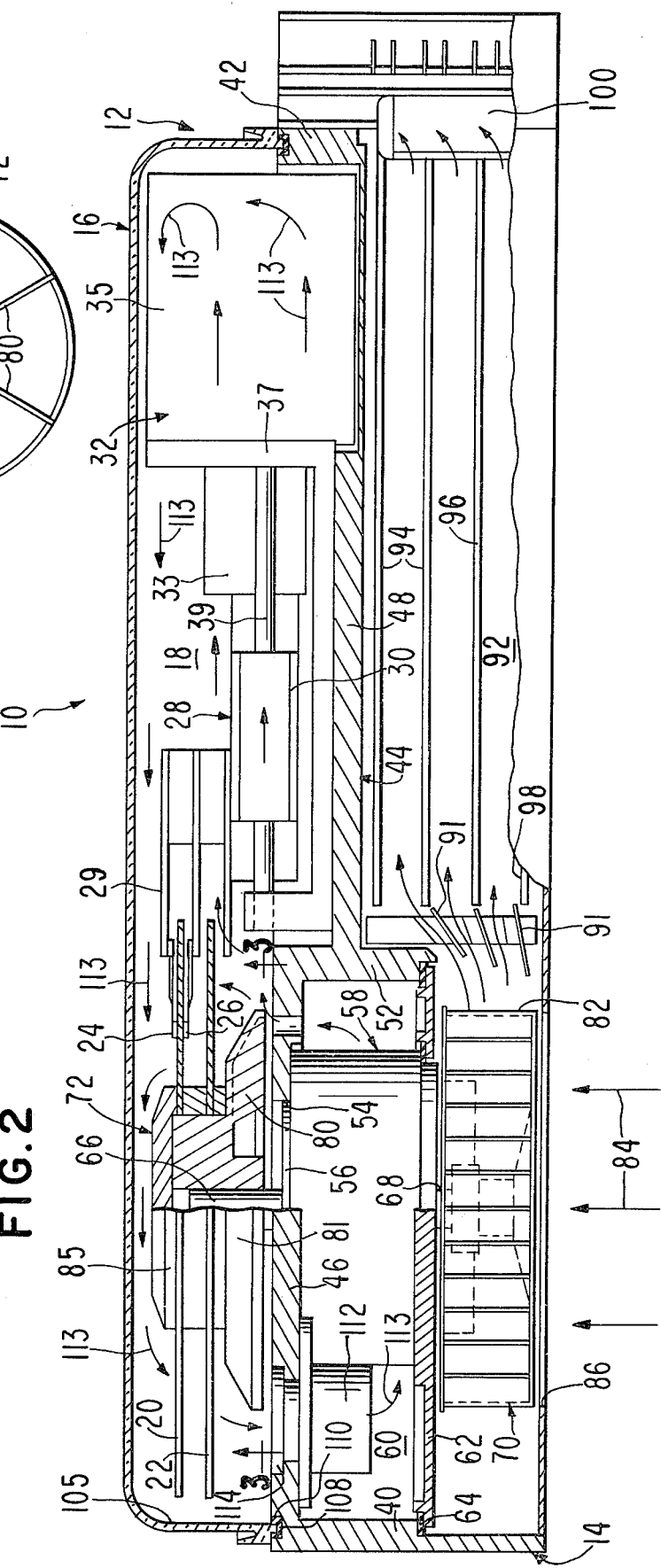
FIG. 2 is a vertical section taken along line 2—2 of FIG. 1.

Motor 58 has a single, rotatable drive shaft with an upper part 66 and a lower part 68, part 66 projecting upwardly into region 18 and part 68 projecting downwardly into a lower region 70 immediately below panel 62 (FIG. 2). To this end, panel 62 is provided with a hole therethrough to allow the lower part shaft 68 to project therethrough, yet this hole is sealed to prevent fluid communication between regions 60 and 70 (FIG. 2).

Figure 4:
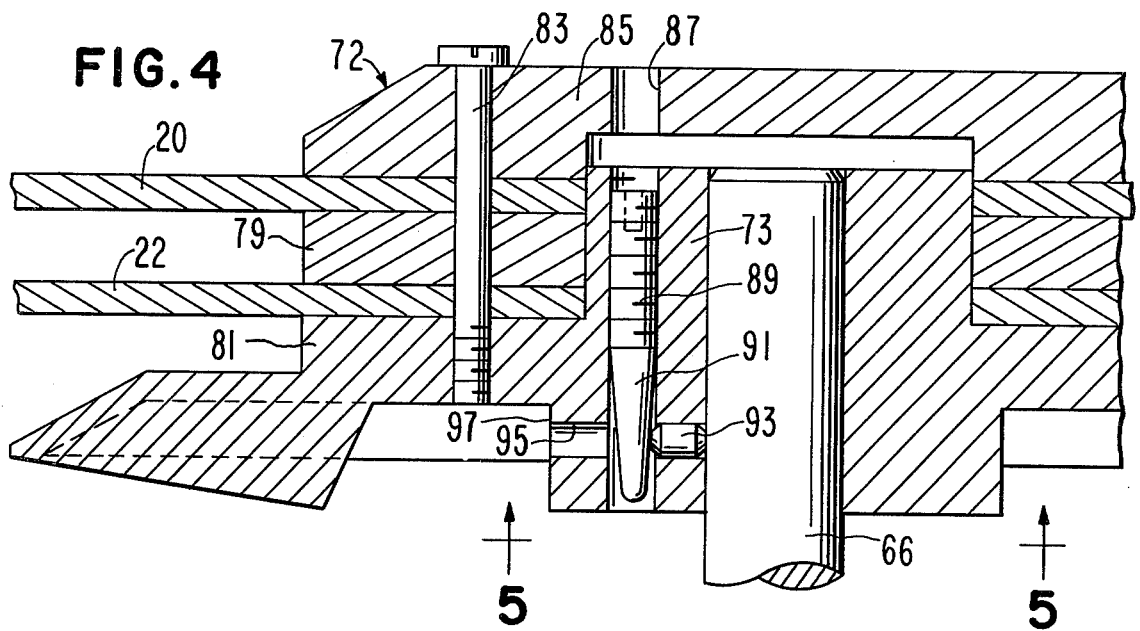
FIG. 4 is an enlarged, fragmentary, cross-sectional view of the hub and the jam screw assembly for securing it to the drive shaft of the drive motor.

A rotatable hub 72 is secured to upper part 66 of the drive shaft of motor 58 by a jam screw assembly. To this end, hub 72 has a central, generally cylindrical part 73 provided with a central bore 75 for receiving upper part 66 as shown in FIG. 4. Magnetic disks 20 and 22 are mounted on central part 73 as shown in FIG. 4, the disks being separated by a spacer 79 and disk 22 being mounted on an annular part 81 forming a flange-like base for central part 73. A machine screw 83 extends through a cap 85 and is threadably coupled into base 81 to secure disks 20 and 22 to central part 73.

Figure 5:
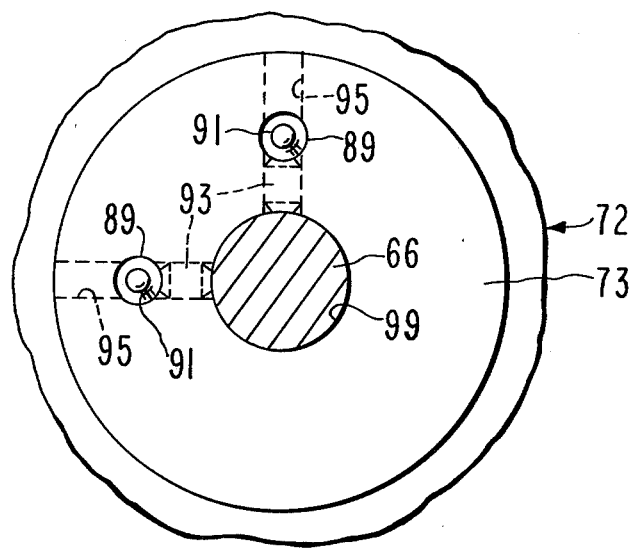
FIG. 5 is a view looking in the direction of line 5—5 of FIG. 4.

Central part 73 has a pair of axially extending bores 87 therethrough which are radially spaced from the central axis of central bore 75. Moreover, bores 87 are at locations which are 90° apart from each other as shown in FIG. 5. A threaded jam screw 89 is provided for each bore 87, respectively. Each jam screw 89 is threaded in the upper end of the respective bore 87 and has an Allen head recess at the upper end to receive an Allen head wrench. Also, each jam screw 89 has a tapered lower part 91 which bears against a plug 93 in a transverse bore 95 extending through the lower extremity of central part 73 as shown in FIG. 4. Bore 95 has an entrance end 97 to permit insertion of the plug into the bore. The plug bears against shaft part 66 when the respective jam screw 89 is rotated so that it moves downwardly to cause the tapered portion 91 to force the plug 93 against shaft part 66. The fact that the two jam parts 89 are 90° apart assures that the shaft will always bear against one portion of the inner periphery of central part 73, namely the portion identified by numeral 99 (FIG. 5).

Jam screw assembly shown in FIGS. 4 and 5 provides an exceedingly tight connection between hub 72 and shaft part 66. Moreover, this assembly does not cause damage to the outer surface of shaft part 66 because the material of plugs 93 is chosen so as to be sufficiently soft, such as brass, to prevent pitting, denting or other damages to the shaft. Thus, adjustments of the hub on shaft part 66 can be made easily.

The lower part of hub 72 is in the shape of an inverted dish to prevent a recess 78 extending upwardly from the open bottom of hub 72. A number of spaced vanes 80 are rigid to lower part 72 and are radially disposed within recess 78 as shown in FIG. 3. For purposes of illustration, there are six such vanes 80. The purpose of the vanes is to create regions of reduced air pressure at the upper extremities of a number of curved slots 82 (FIG. 1) formed in wall section 46 so that air will be drawn by suction out of region 60 and into region 18 above wall 44. This occurrs when hub 72 is rotated upon actuation of motor 58.

As hub 72 rotates, it causes an air flow along the closed fluid path including upper region 18 and central region 60. The path of the air flow is denoted by arrows numbered 113 and the air flows through a filter 112 mounted in an opening 114 in wall section 46 at the junction between regions 18 and 60. In this way, the air is cleaned and dirt and other foreign matter are trapped in the filter as the air continues to flow along the closed path. Thus, the environment in and around disks 20 and 22 is kept substantially clean at all times during operation of the unit.

An impeller 82, such as a squirrel cage impeller, is rigidly secured in any suitable manner to lower shaft part 68 beneath panel 62 for rotation about the axis of the shaft of motor 58 when the motor is actuated. When this occurs, air is drawn in as denoted by arrows 84 into a central hole 86 in a bottom cover 88 for flow along path denoted by numerals 90 past several spaced, angled baffles 91 into region 92 containing a number of circuit boards 94, 96 and 98. The purpose of this air flow is to cool the components and circuitry of the circuit boards during operation of unit 10. The air flows out of region 92 through one or more holes 100 near end wall 42.

External control signals are applied to magnetic pole piece assembly 35 of actuator 32 to cause movement of carriage 30 and thereby heads 24 and 26 accordingly. The heads are secured by any suitable arm means 29 to carriage 30 as shown in FIG. 2.

A breather filter 120 (FIG. 1) coupled to wall section 48 of support wall 44 is used to allow a small amount of air to enter region 18 on start-up of motor 58. Filter 120 has a small pinhole which does not bleed the air in the region 18 during operation of unit 10 because filter 112 is so much larger than the pinhole so as to preclude this from happening.

I claim:

1. In a disk drive unit having a magnetic storage disk and electronic circuitry: a housing including a first region for receiving said magnetic storage disk, said housing having a second region adjacent to the first region and a third region adjacent to and communicating with the second region for containing said circuitry, first region being closed to the atmosphere and the second region being open to the atmosphere; a motor in the housing and provided with a drive shaft having a pair of ends projecting outwardly from the motor in opposite directions, one end of the drive shaft being in the first region for connection to a magnetic storage disk in the first region for rotating the same, the opposite end of the shaft extending into the second region; means in the first region for creating a flow of air along a flow path therein in response to the rotation of the drive shaft; means across said air flow path for cleaning the air as it flows along said path; and means coupled with the opposite end of the drive shaft for generating another flow of air for movement into said third region and into heat exchange relationship with the circuitry.

2. In a disk drive unit as set forth in claim 1, wherein is included a hub secured to the upper end of the drive shaft for mounting the magnetic storage disk for rotation relative to the housing, the airflow creating means being carried by the hub.

3. In a disk drive unit as set forth in claim 2, wherein said hub has a lower margin and said airflow creating means comprises a series of spaced vanes carried by the hub on the lower margin thereof, said vanes being operable to generate a flow of air past the cleaning means as the hub rotates.

4. In a disk drive unit as set forth in claim 1, wherein the third region is at one side of the second region, said generating means comprising an impeller.

5. In a disk drive unit as set forth in claim 4, wherein the housing has a bottom wall provided with an opening therethrough for allowing air to enter the second region in response to the rotation of the impeller, and including a baffle at the junction of the second and third regions for deflecting the air flowing toward the third region.

6. In a disk drive unit of the type having a rotatable magnetic storage disk and electronic circuitry associated with a read-write head coupled to the disk: a housing having a base and a top removably mounted on the base at the upper margin thereof, said housing having an upper region, a lower region, a central region between the upper and lower regions, and a side region laterally spaced and communicating with the lower region, the upper region being formed when the top is mounted on the base, the upper and central regions being closed to the atmosphere and the lower and side regions being open to the atmosphere, the side region containing said circuitry, there being a wall section between the upper and central regions with the wall section having a slot and an aperture therethrough; a drive motor carried by the base in the central region and having a drive shaft provided with a pair of opposed ends, one of the ends extending into the upper region and the other end extending into the lower region; a hub on the upper end of the drive shaft for mounting said magnetic disk in the upper region, the hub having a number of spaced vanes on the lower margin thereof for creating upwardly directed suction forces at the upper margin of the slot in response to the rotation of the drive shaft; a filter carried by the wall section in alignment with the aperture for cleaning the air as the air flows from the upper region through the aperture to the central region in response to the rotation of the hub; and an impeller secured to the lower end of the drive shaft and being operable to create another flow of air into the side region for cooling the circuitry therewithin.

7. In a disk drive unit as set forth in claim 6, wherein the top is transparent, said base having a continuous seal at the upper margin thereof, said top having a lower margin in sealing engagement with the seal on the base.

8. In a disk drive unit as set forth in claim 7, wherein is included means for releasably securing the top to the base.

9. In a disk drive unit as set forth in claim 7, wherein said hub has a recess in the lower margin thereof, the vanes being in said recess and extending radially of the drive shaft, the slot extending circumferentially of the drive shaft and being in vertical alignment with the circular path of travel of the vanes.

10. In a disk drive unit as set forth in claim 7, wherein said base has a second, imperforate wall section extending laterally from said first-mentioned wall section and located above said side region, and including carriage means carried on said second wall section within said upper region for shifting said read-write head relative to the disk.

11. In a disk drive unit as set forth in claim 7, wherein is included an imperforate panel at the junction between the central and lower regions.

12. In a disk drive unit as set forth in claim 7, wherein said hub has jam screw means thereon for mounting the same on said drive shaft.

13. In a disk drive unit having a magnetic storage disk and electronic circuitry: a housing including a first region for receiving said magnetic storage disk, a central region below and communicating with the first region, and a second region adjacent to and below the central region and adjacent to said circuitry, the first region and the central region being closed to the atmosphere and the second region being open to the atmosphere; a motor in the housing and provided with a drive shaft having ends projecting outwardly from the motor in opposite directions, one end of the drive shaft being in the first region for connection to a magnetic storage disk for rotating the same, the opposite end of the shaft extending into the second region; means in the first region for creating a flow of air through the first and central regions in response to the rotation of the drive shaft; means across the path of flow of the air in the first region adjacent to the junction of the first and central regions for cleaning the air; and means coupled with the opposite end of the drive shaft for generating another flow of air for movement into heat exchange relationship with the circuitry.

14. In a disk drive unit as set forth in claim 13, wherein said cleaning means comprises a filter, there being a wall section separating the central and first regions, the wall section having an aperture therethrough, the filter being in alignment with the aperture.

15. In a disk drive unit as set forth in claim 13, wherein the motor is disposed in the central region.

16. In a disk drive unit having a magnetic storage disk and electronic circuitry: a housing having a first region for receiving said magnetic storage disk, a second region below the first region, a third region for receiving said circuitry, and a central region between the first and second regions, there being a wall section between the first and central regions, the wall section having a number of slots therethrough, the first and central regions being closed to the atmosphere and the second region being open to the atmosphere; a motor in the housing and provided with a drive shaft having a pair of ends projecting outwardly from the motor in opposite directions, one end of the drive shaft being in the first region; a hub on said one end of the shaft for mounting a magnetic storage disk for rotation relative to the housing, the opposite end of the motor extending into the second region; a number of spaced vanes on the lower margin of the hub to create upward suction forces at the upper margins of the slots and thereby to create a flow of air through the first and central regions in response to the rotation of the drive shaft; means across the path of flow of the air for cleaning the air as it flows from the first region to the central region; and means coupled with the opposite end of the drive shaft for generating another flow of air for movement into heat exchange relationship with the circuitry.

* * * * *